United States Patent [19]

Ando et al.

[11] Patent Number: 4,736,823
[45] Date of Patent: Apr. 12, 1988

[54] ANTI-SKID DEVICE WITH PLUNGER AND DIAPHRAGM INTEGRATED BY BONDING

[75] Inventors: Hiromi Ando, Tokyo; Kunihiro Matsunaga, Kanagawa, both of Japan

[73] Assignee: Tokico Ltd., Kawasaki, Japan

[21] Appl. No.: 27,823

[22] Filed: Mar. 19, 1987

[30] Foreign Application Priority Data

Apr. 18, 1986 [JP] Japan ............................ 61-58306[U]

[51] Int. Cl.$^4$ .............................................. B60T 8/093
[52] U.S. Cl. ................................. 188/181 A; 303/115; 303/116
[58] Field of Search .......... 188/181 A, 181 R, 181 C; 303/113–119, 68–69, 61–63

[56] References Cited

U.S. PATENT DOCUMENTS

| | | | |
|---|---|---|---|
| 4,260,201 | 4/1981 | Farr | 188/181 A X |
| 4,353,440 | 10/1982 | Farr | 188/181 A |
| 4,377,221 | 3/1983 | Farr | 188/181 A |
| 4,401,348 | 8/1983 | Farr | 303/116 |
| 4,553,651 | 11/1985 | Gaiser et al. | 303/24 A X |
| 4,602,705 | 7/1986 | Farr et al. | 303/116 X |
| 4,610,483 | 9/1986 | Matsumoto et al. | 303/97 |
| 4,633,981 | 1/1987 | Farr | 303/116 X |
| 4,648,664 | 3/1987 | Yardley | 303/115 |

FOREIGN PATENT DOCUMENTS

55-36187 3/1980 Japan .

*Primary Examiner*—Douglas C. Butler
*Attorney, Agent, or Firm*—Wenderoth, Lind & Ponack

[57] ABSTRACT

An anti-skid device for use in a vehicle hydraulic brake system comprising a hydraulic pressure generating device for generating hydraulic pressure in response to actuation of a brake pedal, a brake cylinder for receiving the hydraulic pressure from the hydraulic pressure generating device and for applying brake force to a wheel of the vehicle, a passage through which the hydraulic pressure is adapted to be transmitted from the hydraulic pressure generating device to the brake cylinder, lock detecting device for detecting that a wheel is locked and a damping valve designed to function to interrupt the transmission of the hydraulic pressure from the hydraulic pressure generating device to the brake cylinder and to further reduce the pressure in the brake cylinder when the lock detecting mechanism detects that wheel is locked so that the wheel-lock may be released. The damping valve comprises a plunger movable such as to open and close a valve seat and a diaphragm for movably supporting the plunger and for liquid-tightly sealing a valve chamber defined around the valve seat. The plunger is integrated with the diaphragm by bonding and is provided at one end thereof with a valve body having a spherical surface portion for contacting the valve seat.

3 Claims, 3 Drawing Sheets

ANTI-SKID DEVICE WITH PLUNGER AND DIAPHRAGM INTEGRATED BY BONDING

BACKGROUND OF THE INVENTION

This invention relates to an anti-skid device for use in a vehicle hydraulic braking system, and more particularly relates to an anti-skid device that includes a damping valve for retaining and releasing hydraulic pressure in the anti-skid device.

One example of this type of anti-skid device for use in a vehicle is disclosed in U.S. patent application Ser. No. 847,779 filed on Apr. 3, 1986 which was assigned to the same entity as the assignee of the present application. The anti-skid device of that type mainly consists of three means, namely, lock detecting means for detecting the fact that a wheel of a vehicle on which the anti-skid device is installed is locked, hydraulic pressure control means for retaining the hydraulic pressure in the device when the wheel is unlocked and for releasing the hydraulic pressure in the device when the wheel is locked, thereby to reduce hydraulic pressure in a brake cylinder applying braking force to the wheel so that the wheel-lock may be released, and pumping means for increasing the hydraulic pressure in the device to bring the braking force back up to the level subsisting before it was decreased in anti-skid operation. The anti-skid device is usually disposed midway along a passage through which hydraulic pressure generated in a master cylinder by operation of a brake pedal is adapted to be transmitted to the brake cylinder. The hydraulic pressure control means is provided with a damping valve that is actuated in response to the detection of wheel-lock by the lock detecting means to interrupt the supply of hydraulic pressure from the master cylinder to the brake cylinder and to further reduce the pressure in the brake cylinder so that the wheel-lock may be released.

The damping valve aforementioned is provided with a plunger that is axially movably supported at one end thereof by a diaphragm which is mounted such as to prevent leaking of brake oil from the valve to the outside thereof. The plunger includes a cone-shaped portion formed at the other end thereof which is adapted to contact with and separate from a seat of the valve to connect and interrupt communication between a cylinder chamber of the hydraulic pressure control means and an oil reservoir of the master cylinder.

With this damping valve, however, the fastening force by which the plunger is secured to the diaphragm is influenced by the resilience of the diaphragm. Therefore, when the material of the diaphragm deteriorates owing to repeated anti-skid operations, slight clearance will be generated between the plunger and the diaphragm which results in liquid leakage. Further, in order to ensure that the valve seat is closed without fail, the cone-shaped portion of the plunger must be formed with high precision and the diaphragm also needs to be mounted very precisely so that the plunger can be displaced up and down in coaxial relation with the valve seat.

SUMMARY OF THE INVENTION

The present invention has been accomplished in view of the aforesaid problem and the object of the invention is to provide an anti-skid device for use in a vehicle hydraulic braking system which facilitates reliable sealing and is easy to manufacture.

According to the invention, such object is accomplished by an anti-skid device which comprises a hydraulic pressure generating device for generating hydraulic pressure in response to actuation of a brake pedal, a brake cylinder for receiving the hydraulic pressure from the hydraulic pressure generating device and for applying brake force to a wheel of the vehicle, a passage through which the hydraulic pressure is adapted to be transmitted from the hydraulic pressure generating device to the brake cylinder, lock detecting means for detecting the wheel being locked, and a damping valve designed to interrupt the transmission of the hydraulic pressure from the hydraulic pressure generating device to the brake cylinder and to further reduce the pressure in the brake cylinder when the lock detecting means detects the wheel being locked, characterized in that said damping valve comprises a plunger movable such as to close and open a valve seat, and a diaphragm for movably supporting the plunger and for liquid-tightly sealing a valve chamber defined around the valve seat, that the plunger is integrated with the diaphragm by bonding, and that the plunger is provided at one end thereof with a valve body having a spherical surface portion for making contact with the valve seat.

In one embodiment, the integration of the plunger with the diaphragm is accomplished by fitting the plunger into a bore of the uncured diaphragm and by thereafter curing the diaphragm.

In another embodiment, the valve body is a ball and the plunger is provided with at least one caulking piece formed on the end thereof, the ball being secured to the end of the plunger by caulking the caulking piece.

BRIEF DESCRIPTION OF THE DRAWINGS

The objects and features of the invention may be understood by referring to the following detailed description of illustrative embodiments of the invention, taken together with the accompanying drawings, in which.

DETAILED DESCRIPTION OF THE PREFERRED EMBODIMENTS

Figure 1:
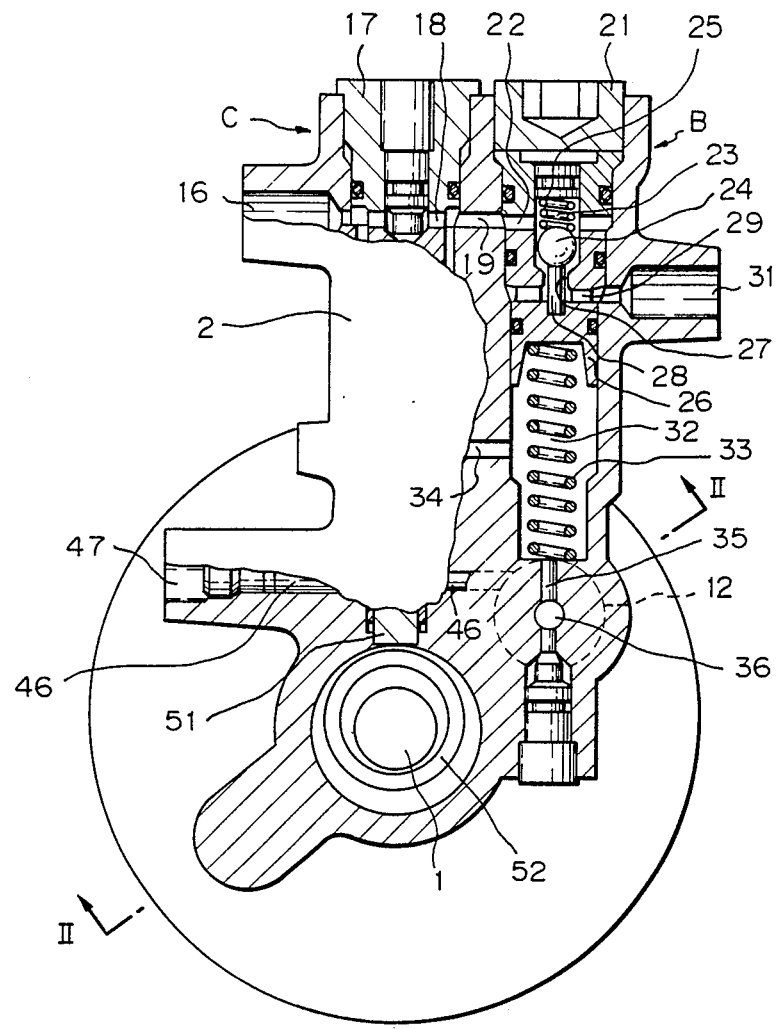
FIG. 1 is a partially sectional view showing one example of a prior art anti-skid device.
Figure 2:
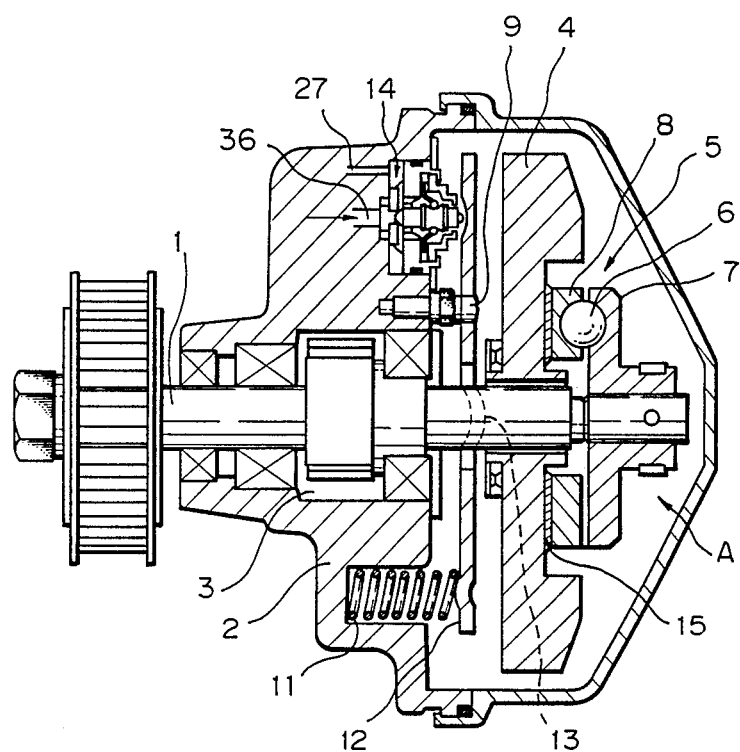
FIG. 2 is a sectional view taken along a line II—II in FIG. 1.
Figure 3:
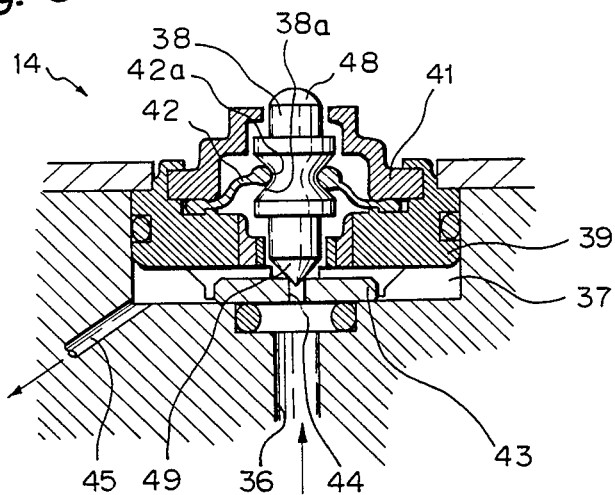
FIG. 3 is a sectional view of a damping valve employed in the anti-skid device shown in FIG. 1.

For the sake of assisting the reader's understanding of the present invention, one prior art anti-skid device will firstly be explained by referring to FIGS. 1 to 3, which device can be improved by application of the present invention thereto.

FIG. 1 is a partially sectional view showing a main portion of an anti-skid device and FIG. 2 is a sectional view taken along the line II—II in FIG. 1.

The device comprises lock detecting means A for detecting that a wheel is locked, hydraulic pressure control means B for reducing brake hydraulic pressure in response to the detection of wheel-lock by the lock detecting means A, and pumping means C for bringing back up the level of the hydraulic pressure which has been lowered. The device is adapted to be disposed midway along a passage through which hydraulic pressure generated in a master cylinder (not shown) by operation of a brake pedal (not shown) can be transmitted to brake cylinders of the vehicle on which the anti-skid device is installed. The anti-skid device is usually disposed in each of two lines of hydraulic pressure passages which are arranged to interlockingly control each of a pair of wheels which are located in diagonally opposite positions and thus to accomplish its anti-skid function.

Explanation of the lock detecting means A will now be given. Shown at 1 is an axle of a wheel inserted through a bore 3 formed in a housing 2. A flywheel 4 is axially slideably mounted on the axle 1. The axle 1 and the flywheel 4 are adapted to be switched between an interlocking condition and a non-interlocking condition by means of a ball ramp mechanism 5. The ball ramp mechanism 5 includes first and second ramp members 7 and 8 mounted on the axle 1 and flywheel 4, respectively, and provided with respective ramp grooves adapted to receive a ball 6. A lever 12 is pivotally mounted on a fulcrum member 9 standing on the housing 2 and is biased in the counterclock direction (as viewed in FIG. 2) around the fulcrum member 9 by a compressed spring 11. A cup-shaped portion 13 on the lever 12 abuts against the flywheel 4 to push it rightward, as viewed in FIG. 2, so that the first ramp member 7 mounted on the axle 1 and the second ramp member 8 mounted on the flywheel 4 are connected through the ball 6.

With the lock detecting means A constructed in such a manner as that described above, the axle 1 and flywheel 4 interlockingly rotate in the normal rotating condition, and while the axle 1 stops when the wheel is locked, the flywheel 4 tends to continue its rotation due to its inertial energy. Therefore, the flywheel 4 rotates relative to the axle 1 and the ball 6 interposed between the first and second ramp members acts to displace the flywheel 4 leftwardly as viewed in FIG. 2. In response to the displacement of the flywheel 4, the lever 12 is rotated clockwise around the fulcrum member 9 through the cup-shaped portion 13 of the lever 12. Further, as will be explained in detail hereinafter, a damping valve 14 is actuated to its open condition in response to the clockwise rotation of the lever 12 and, in turn, brake liquid in the hydraulic pressure control means B is fed back to a reservoir of a master cylinder (not shown) through the damping valve 14 and a port 47 (see FIG. 1), so that braking force is reduced.

Although, in the condition described just above, the flywheel 4 is overrunning relative to the axle 1, its rotation is gradually decelerated due to the function of a friction plate 15 disposed between the flywheel 4 and the second ramp xember 8. On the other hand, the wheel and axle 1 begin to rotate again due to the decrease in braking force and the flywheel 4 is displaced to its normal position. The lever 12 is rotated counterclockwise through the spring 11 to return the damping valve 14 to its closed position. The ball ramp mechanism 5 is also returned to its original position.

In FIG. 1, shown at 16 is an inlet port which is connected to the master cylinder (not shown) which is adapted to be actuated through a booster (not shown) by a brake pedal (not shown) to generate hydraulic pressure. The master cylinder and booster can be of traditional types. The master cylinder is provided with a reservoir (not shown).

The inlet port 16 is communicated with a chamber 23 through a chamber 18 formed in a cap member 17 of the pumping means C, a passage 19 formed in the housing 2, and a passage 22 formed in a cap member 21 of the hydraulic pressure control means B. A ball 24 is disposed in the chamber 23 and is biased downwardly by a spring 25, as viewed in FIG. 1. The ball 24 also abuts against a rod 28 which is secured to a piston 26 and extends through a valve opening 27 and is separated from a valve seat formed by the upper peripheral edge of the valve opening 27 in normal condition as shown in FIG. 1. Therefore, the chamber 23 normally communicates with a chamber 29 defined between the cap member 21 and the piston 26 and further with an outlet port 31.

The piston 26 is axially slideably disposed in a cylinder chamber 32 and is biased upwardly by a spring 33, as viewed in FIG. 1. The cylinder chamber 32 communicates through a passage 34 with a pump chamber (not shown) of the pumping means C. The cylinder chamber 32 also communicates through a passage 35 with one end of a passage 36 which itself communicates with the damping valve 14.

As best shown in FIG. 3, a plunger 38 is movably disposed in a valve chamber 37 of the damping valve 14, with a groove 38a formed at an intermediate position along the length of the plunger 38 being tightly fitted in a center aperture 42a of a diaphragm 42 the periphery of which is liquid-tightly and sealingly secured between a retainer 39 and a cap 41. The plunger 38 cooperates with a valve seat 44 of a seat member 43 to connect and interrupt the communication between the passage 36 and a passage 45 which also communicates with the valve chamber 37. The passage 45 is communicated with the reservoir of the master cylinder through a passage 46 and a port 47 (see FIG. 1). As shown in FIG. 2, a head 48 of the plunger 38 is engaged with one end of the lever 12. Since the spring 11 applies force on the other end of the lever 12 which tends to rotate the lever 12 counterclockwise around the fulcrum member 9, the plunger 38 is subjected to force in the leftward direction. Therefore, a tip 49 of the plunger 38 or a cone-shaped portion normally abuts against the valve seat 44 so that the damping valve 14 is in closed condition as shown in FIG. 3.

In the anti-skid device constructed in such a manner as that described above, when the brake pedal is depressed, brake oil is supplied to the brake cylinders from the master cylinder through the inlet port 16, chamber 18, passages 19 and 22, chamber 23, valve opening 27, chamber 29 and outlet port 31 to thereby apply brake force to the wheel. Since hydraulic pressure is transmitted to the chamber 29, the pressure in the chamber 32 is also increased. The wheel is decelerated due to the brake force being applied thereto. When this deceleration exceeds a predetermined level, the rotational speed of the axle 1 becomes lower than that of the flywheel 4 so that the flywheel 4 is displaced leftwardly due to the function of the ramp mechanism 5 as viewed in FIG. 2. The flywheel 4 cooperates with the cup-shaped portion 13 of the lever 12 to rotate the lever 12 clockwise around the fulcrum member 9. Then the head 48 of the plunger 38 is released. Due to the hydraulic pressure on the side of the passage 36, therefore, the plunger 38 is displaced rightwardly as viewed in FIG. 2 and upwardly as viewed in FIG. 3, and separates from the valve seat 44. Thus, the damping valve 14 is opened to allow the liquid in the cylinder chamber 32 to flow into the reservoir through the passages 35 and 36, valve chamber 37, passages 45 and 46 and port 47. Since the amount of liquid in the cylinder chamber 32 is reduced, the pressure in the cylinder chamber 32 lowers and the piston 26 is displaced downwardly (as viewed in FIG. 1) due to the hydraulic pressure in the chamber 29. The rod 28 is also displaced downwardly. Therefore, the ball 24 is biased downwardly by the spring 25 to abut against the valve seat, thereby interrupting the communication between the chamber 23 and the outlet port 31. Thus, the transmitting of hydraulic pressure to the brake cylinder is interrupted.

As the piston 26 is further displaced downwardly, the capacity of the chamber 29 is increased to result in a drop in the hydraulic pressure in the brake cylinder. In this condition, the axle 1 begins to recover its rotational movement and the rotational speed of the axle 1 approaches that of the flywheel 4 which is being decelerated. Then, the ball ramp mechanism 5 reaches a condition in which it can return to its normal position, and the flywheel 4 is displaced rightwardly as viewed in FIG. 2 due to the spring force of the spring 11. Simultaneously, the lever 12 is rotated counterclockwise about the fulcrum member 9 so that the one end thereof displaces the plunger 38 leftwardly to thereby close the damping valve 14. In this condition, the liquid in the cylinder chamber 32 is prevented from flowing into the reservoir.

Prior to closing of the damping valve 14, when the hydraulic pressure in the cylinder chamber is dropped, the hydraulic pressure of the pump chamber (not shown) of the pumping means C is also reduced since both chambers communicates through the passage 34. A piston 51 is disposed in the pumping means C such that the piston 51 is normally retracted in position as shown in FIG. 1 and is displaced downwardly to come into contact with a eccentric cam 52 mounted on the axle 1 when the pressure in the pump chamber is reduced. Therefore, when the axle 1 that is stopped begins to rotate as described above, the piston 51 is reciprocated up and down whereby the pumping operation of the pumping means C is started, thereby to feed the liquid in the reservoir into the cylinder chamber 32. After the closing of the damping valve, therefore, the hydraulic pressure in the cylinder chamber 32 rapidly gets higher to displace the piston 26 and the ball 24 upwardly against the force of the spring 25 as viewed in FIG. 1, so that the outlet port 31 is communicated with the inlet port and the transmission of the hydraulic pressure to the brake cylinder is reopened. Since a pumping means having the same principle as that of the pumping means C is disclosed in U.S. patent application Ser. No. 847,779 aforementioned, which is incorporated herein by reference, further detailed explanation of the operation of the pumping mechanism C will be omitted.

The damping valve 14 of the aforementioned anti-skid device is constructed as shown in FIG. 3.

In the damping valve 14, the plunger 38 which acts as a valve body supported movably up and down by the diaphragm 42 is actuated by the lever 12 to open and close the valve seat 44. Through this opening and closing operation, the damping valve 14 connects and interrupts the communication between the passage 36 that communicates with the cylinder chamber 32 of the hydraulic pressure control means B and the passage 45 for feeding the brake oil to the reservoir of the master cylinder.

Figure 4:
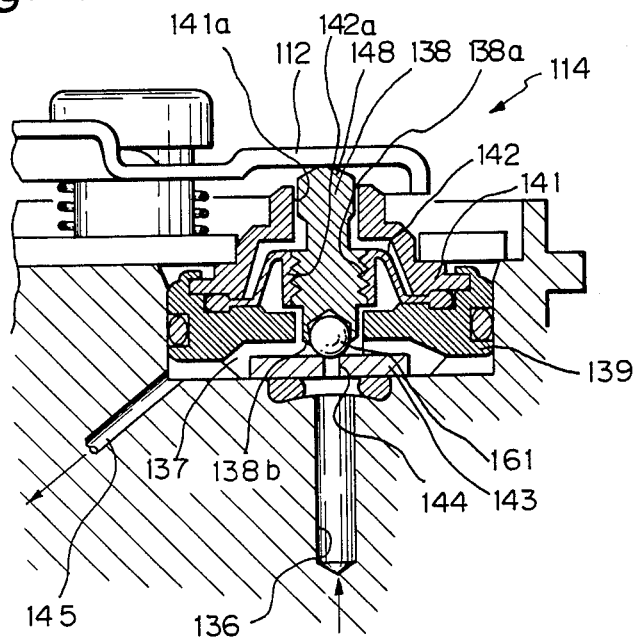
FIG. 4 is a sectional view of a damping valve according to the invention.

FIG. 4 shows a damping valve 114 employed in a preferred embodiment of an improved anti-skid device according to the present invention. The anti-skid device also comprises lock detecting means, hydraulic pressure control means and pumping means, which three means may be similar to those of the anti-skid device explained hereinabove as a prior art device, except for the damping valve 114. Therefore, explanation will solely be given of the damping valve 114 and explanation of the constitution and operation of other parts of the anti-skid device according to the invention will be omitted.

The damping valve 114 is also provided with a passage 136 which communicates with a cylinder chamber of the hydraulic pressure control means and passage 145 for feeding brake oil into a reservoir of a master cylinder, which passages are communicated with a valve chamber 137. A retainer 139 and a cap 141 which are closely fitted to the valve chamber 137 sandwich therebetween and secure the periphery of a diaphragm 142 which supports a plunger 138.

The plunger 138 is integrated with the diaphragm 142 with a grooved portion 138a formed on the outer periphery of the plunger 138 and a tubular portion 142a of the diaphragm 142 being bonded to each other. Though various suitable means can be employed for bonding the plunger 138 and diaphragm 142, in the present embodiment the integration is accomplished by fitting the plunger 138 into the bore 142a of the diaphragm 142 when in its uncured condition and by curing the diaphragm 142 thereafter.

One end 148 of the plunger 138 is axially slideably inserted through a bore 141a formed in the cap 141. The plunger 138 is further provided with a plurality of caulking pieces 138b formed on the other end thereof and a ball or valve body 161 is adapted to be fixedly held by caulking the pieces 138b. When a spherical surface of the valve body 161 is in contact with a valve seat 144 of a valve member 143 disposed at the bottom of valve chamber 137, the damping valve 114 is closed.

Shown at 112 is a lever which functions similarly to the lever 12 in the prior art device aforementioned. The lever 112 is usually engaged with the plunger 138 to bias the plunger 138 toward the valve seat 144 (downwardly as viewed in FIG. 4) thereby keeping the damping valve 114 in closed condition, and this is rotated by means of a flywheel (not shown) in the same manner as the lever 12 in the prior art device aforementioned to separate from and release the plunger 138, thereby opening the damping valve 114 when wheel-lock occurs.

In the damping valve 114 which has a constitution such as that described above, the valve body 161 is adapted to close the valve seat 144 in the normal running condition, similarly to the prior art damping valve. When skid phenomenon is generated, the lever 112 is rotated to separate from the plunger 138 so that the plunger 138 moves upwardly (as viewed in FIG. 4) and the valve body 161 separates from the valve seat 144 to open the damping valve 114.

As described heretofore, it is possible according to the invention to prevent hydraulic liquid from leaking between the diaphragm and the plunger since the plunger is integrated with the diaphragm by bonding. Further, the valve seat of the damping valve is adapted to be opened and closed by the spherical portion of the valve body mounted on one end of the plunger. Therefore, the plunger need not be formed with high precision and it is possible to close the valve seat without fail even though the plunger is tilted and supported by the diaphragm.

What is claimed is:

1. An anti-skid device for use in a vehicle hydraulic braking system comprising a hydraulic pressure generating device for generating hydraulic pressure in response to actuation of a brake pedal, a brake cylinder for receiving the hydraulic pressure from the hydraulic pressure generating device and for applying brake force to a wheel of the vehicle, a passage through which the hydraulic pressure generated in the hydraulic pressure generating device is adapted to be transmitted to the brake cylinder, lock detecting means for detecting that the wheel is locked and a damping valve designed to function to interrupt the transmission of the hydraulic pressure from the hydraulic pressure generating device to the brake cylinder and to further reduce the pressure in the brake cylinder when the lock detecting means detects that the wheel is locked so that the wheel-lock may be released, characterized in that said damping valve comprises a plunger movable such as to open and close a valve seat and a diaphragm for movably supporting the plunger and for liquid-tightly sealing a valve chamber defined around the valve seat, that the plunger is integrated with the diaphragm by bonding, and that the plunger is provided at one end thereof with a valve body having a spherical surface portion for coming into contact with the valve seat.

2. An anti-skid device according to claim 1, wherein the integration of the plunger with the diaphragm is accomplished by fitting the plunger into a bore of the diaphragm when in an uncured condition and by thereafter curing the diaphragm.

3. An anti-skid device according to claim 1, wherein the valve body is a ball and the plunger is provided with at least one caulking piece formed on one end thereof, the ball being secured to the one end of the plunger by caulking the caulking piece.

* * * * *